United States Patent [19]
Dubey et al.

[11] Patent Number: 5,917,967
[45] Date of Patent: Jun. 29, 1999

[54] TECHNIQUES FOR FORMING OPTICAL ELECTRONIC INTEGRATED CIRCUITS HAVING INTERCONNECTS IN THE FORM OF SEMICONDUCTOR WAVEGUIDES

[75] Inventors: Madan Dubey, South River; Kenneth A. Jones, Brick; Weiyu Han, Edison; Lawrence C. West, Clarksburg, all of N.J.

[73] Assignee: The United States of America as represented by the Secretary of the Army, Washington, D.C.

[21] Appl. No.: 08/861,387

[22] Filed: May 21, 1997

[51] Int. Cl.$^6$ ............................................. G02B 6/10
[52] U.S. Cl. .......................... 385/14; 385/132; 385/131
[58] Field of Search ................................ 385/129, 130, 385/131, 132, 14; 372/50

[56] References Cited

U.S. PATENT DOCUMENTS

| | | | |
|---|---|---|---|
| 5,687,272 | 11/1997 | Vinchant et al. | 385/131 |
| 5,703,989 | 12/1997 | Khan et al. | 385/130 |
| 5,710,439 | 1/1998 | Ohkubo | 257/85 |
| 5,754,714 | 5/1998 | Suzuki et al. | 385/131 |
| 5,787,105 | 7/1998 | Okamoto et al. | 372/50 |

OTHER PUBLICATIONS

Dubey et al. "Ge Optical Interconnects on a GaAs Surface." Materials Research Society Symposium Proceedings, vol. 340 pp. 411–416, 1994.

Foti et al. "Effect of structure and impurities on the epitaxial regrowth of amorphous silicon." Applied Physics Letters, vol. 36, No. 10, pp. 840–842, May 1980.

*Primary Examiner*—Hung N. Ngo
*Attorney, Agent, or Firm*—Michael Zelenka

[57] ABSTRACT

An optical electronic integrated circuit (OEIC) having optical waveguides as device interconnects. An optical waveguide is formed by depositing, in an oxygen-free atmosphere, a film of semiconductor material on a semiconductor substrate at a temperature that substantially diminishes the porosity of the film and the diffusion of material from the substrate into the film. The semiconductor film, which has an index of refraction greater than that of the substrate, is etched to form the optical waveguide on the substrate. The substrate also supports a to plurality of active optical devices between which the optical waveguide extends. The substrate is preferably formed from gallium-arsenide and the waveguide from germanium. The active devices may also include these materials as well as aluminum-gallium-arsenide. When using these materials, the germanium film is deposited in an oxygen-free environment at about 100 degrees centigrade.

7 Claims, 2 Drawing Sheets

TECHNIQUES FOR FORMING OPTICAL ELECTRONIC INTEGRATED CIRCUITS HAVING INTERCONNECTS IN THE FORM OF SEMICONDUCTOR WAVEGUIDES

GOVERNMENT INTEREST

The invention described herein may be manufactured, used, and licensed by or for the Government for governmental purposes without the payment to us of any royalty thereon.

FIELD OF THE INVENTION

The present invention relates to optical electronic integrated circuits (OEICs). More specifically, the invention relates to techniques for fabricating OEICs having optical interconnects in the form of waveguides capable of transmitting light.

BACKGROUND OF THE INVENTION

In recent years, artisans have made significant advances in fabricating and using optical electronic integrated circuits (OEICs). These improved circuits, which often contain active optical devices capable of operating in the femtosecond regime, have found significant applications in a number of fields including optical computing and communications. However, those concerned with designing OEICs have recognized the need for developing improved optical interconnects capable of transmitting light between the active devices that form these integrated circuits.

Conventional OEICs usually employ thin-film optical waveguides as device interconnects. Specifically, circuit fabricators have used thin films of semiconductor materials to form optical waveguides directly on the surface of OEIC structures. Although many of these waveguides have served the purpose, none have proved entirely satisfactory because of difficulties encountered in fabricating optical waveguides with sufficiently high transmission efficiencies to operate effectively with most of the recently developed high-speed OEIC devices. Fabricators of OEICs have therefore recognized the need to develop improved techniques of forming optical waveguides on OEIC structures such that the waveguides do not absorb appreciable amounts of the transmitted light while at the same time they contain the light. The present invention fulfills this need.

SUMMARY OF THE INVENTION

The general purpose of this invention is to provide techniques for fabricating OEICs having waveguides that efficiently transmit light. One aspect of the present invention is directed to a method of fabricating an optical waveguide for transmitting radiation having a predetermined range of wavelengths. The method comprises forming a semiconductor substrate and depositing, in an oxygen-free atmosphere, a film of semiconductor material on the substrate at a temperature that substantially diminishes the porosity of the film and the diffusion of material from the substrate into the film. Finally, the deposited film, which has an index of refraction greater than that of the substrate, is etched to form optical waveguides on the substrate.

Another aspect of the invention is directed to an optical waveguide structure for transmitting radiation having a predetermined range of wavelengths. The waveguide structure includes a semiconductor substrate and an optical waveguide mounted on the substrate. The optical waveguide is formed from a film of semiconductor material grown on the substrate surface. The film of semiconductor material has an index of refraction that is greater than that of the substrate and has a relatively small, uniform absorption coefficient over the predetermined range of wavelengths. The semiconductor film preferably comprises germanium and the semiconductor substrate may be formed from gallium-arsenide. The semiconductor film is deposited at a temperature of about 100 degrees centigrade such that the film has a substantially diminished porosity and contains a substantially diminished amount of gallium-arsenide.

The exact nature of this invention, as well as other objects and advantages thereof, will be readily apparent from consideration of the following specification relating to the annexed drawing.

DETAILED DESCRIPTION

Figure 1:
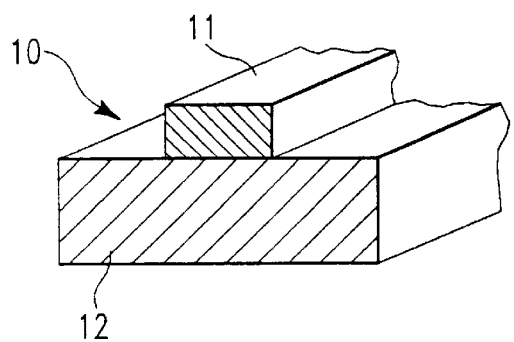
FIG. 1 is a schematic pictorial view showing a cross section of a rectangular optical waveguide for use as part of an optical electronic integrated circuit (OEIC).
Figure 2:
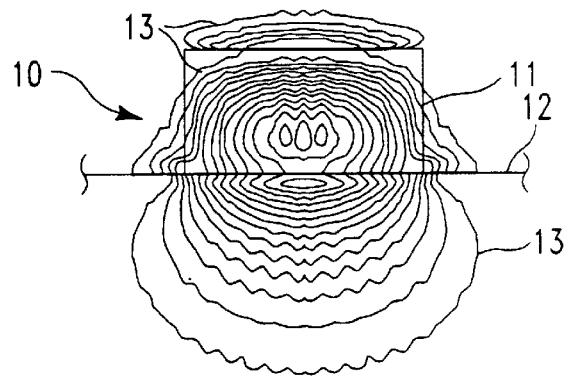
FIG. 2 is a radiation pattern showing constant-field contour lines superimposed on a cross sectional outline of the FIG. 1 OEIC.

Referring now to the drawings, FIG. 1 shows a portion of optical electronic integrated circuit (OEIC) 10 having rectangular semiconductor waveguide 11 mounted on the surface of semiconductor substrate 12. The width of rectangular waveguide 11 would typically be twice its height. FIG. 2 illustrates an outline of OEIC 10 with constant-field contour lines superimposed thereon to represent the radiation pattern for light being transmitted through waveguide 11.

Figure 3:
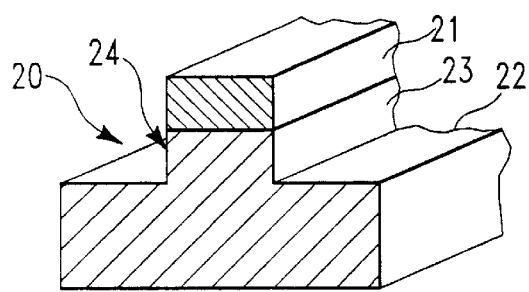
FIG. 3 is a schematic pictorial view showing a cross section of a pedestal optical waveguide for use as part of an OEIC.
Figure 4:
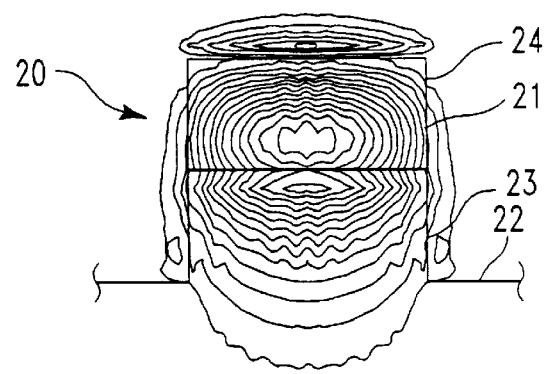
FIG. 4 is a radiation pattern showing constant-field contour lines superimposed on a cross sectional outline of the FIG. 4 OEIC.

FIG. 3 shows a portion of optical electronic integrated circuit 20 having pedestal waveguide 24, which includes rectangular semiconductor waveguide 21 and semiconductor pedestal 23, mounted on the surface of semiconductor substrate 22. The width of pedestal waveguide 24 would typically be twice the height of pedestal 23 and twice the height of rectangular waveguide 21, thereby rendering the height of pedestal waveguide 24 to be equal to its width. FIG. 4 shows an outline of OEIC 20 with conventional constant-field contour lines superimposed thereon to represent the radiation pattern for light being transmitted via pedestal waveguide 24.

Germanium (Ge) is a semiconductor material that has received particular attention for use as an optical waveguide material because it has a number of major advantages. Germanium is optically transparent at 10 microns; an important wavelength of interest since light can be generated economically at this wavelength by conventional carbon-dioxide lasers. Using molecular beam epitaxial (MBE) techniques, fabricators readily grow single-crystal germanium films on most OEIC-type materials because these materials possess compatible matching properties with germanium. Specifically, germanium has crystallographic properties that closely match those of gallium-arsenide (GaAs) and aluminum-gallium-arsenide (AlGaAs), two of the most promising OEIC materials. Germanium and gallium-arsenide contain virtually the same crystal structure with lattice parameters that are almost equal; lattice parameter $a_0$ for germanium equals 0.5677 microns and for gallium-arsenide equals 0.56535 microns. Additionally, germanium and gallium-arsenide possess substantially the same thermal coefficients. Still further, germanium has a substantially greater index of refraction than does gallium-arsenide, 4.0 for germanium vs 3.27 for gallium-arsenide.

Consequently, the present invention contemplates the use of germanium (Ge), gallium-arsenide (GaAs) and aluminum-gallium-arsenide (AlGaAs) as preferred materials for fabricating OEICs using waveguides 11 and 24. Using conventional MBE techniques, rectangular waveguide 11 can be formed by etching a germanium film that has been deposited on the surface of a gallium-arsenide substrate, i.e., substrate 12. In like manner, pedestal waveguide 24 can be formed by depositing a germanium film on a gallium-arsenide substrate, i.e., substrate 22, etching the germanium film to form rectangular waveguide 21, and then further etching an equal depth of gallium-arsenide substrate 22 to form gallium-arsenide pedestal 23.

It is further contemplated that waveguides 11 and 24 can be fabricated to act as ultra-high confinement (UHC) waveguides. Waveguides 11 and 24 will confine radiation in a manner depicted by the constant-field contour lines shown in the respective diagrams of FIGS. 2 and 4. Although both types of UHC waveguides can transmit light with appreciable degrees of confinement, FIG. 4 shows that the coupling for pedestal waveguide 24 is usually stronger than for waveguide 11.

Mid-infrared (IR) radiation, radiation in the 10 micron region, will be easily confined to UHC waveguides 11 and 24 through multiple internal reflections because there is a large index-of-refraction difference between germanium and air, 4.0 vs. 1.0, respectively, and between germanium and gallium-arsenide, 4.0 vs 3.27, respectively. Because of these large index-of-refraction differences, waveguides with cross sectional dimensions of only a fraction of the wave length of the transmitted light can operate effectively as waveguides 11 and 24. For example, the present invention conceives of waveguides 11 and 24 having sub-micron cross sectional dimensions that are capable of transmitting light having wavelengths in the 2.5–13 micron region.

Figure 5:
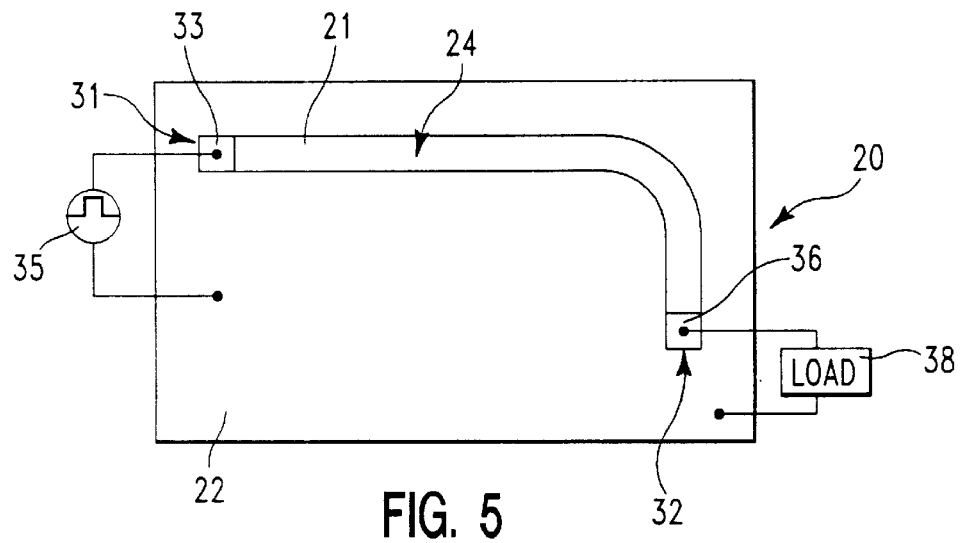
FIG. 5 is a schematic top plan view of an OEIC using a FIG. 3 optical waveguide as a device interconnect.
Figure 6:
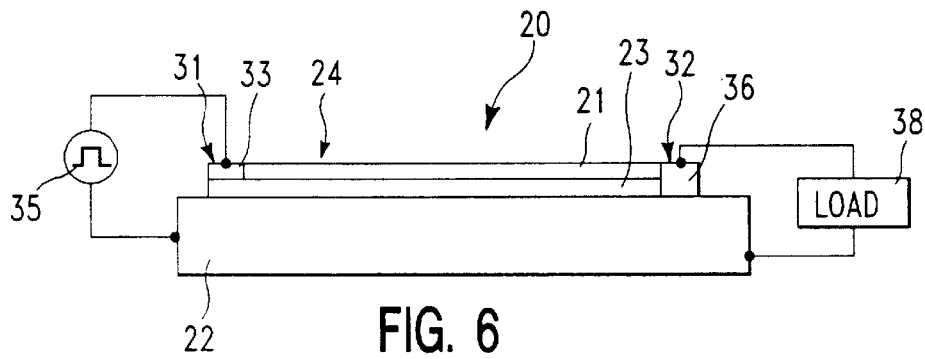
FIG. 6 is a side elevation of the FIG. 5 OEIC.

FIGS. 5 and 6 depict OEIC 20 having pedestal waveguide 24 mounted on the upper surface of substrate 22 to form a curved interconnection between a first active OEIC device, light emitting diode (LED) 31, to a second active OEIC device, photodetector 32. LED 31 provides output light pulses in response to electrical input pulses from signal generator 35, which connects across LED 31. The light pulses propagate along waveguide 24 from LED 31 to photodetector 32 where they are absorbed by layer 36, which generates a voltage across load 38.

Using conventional epitaxial techniques, such as MBE, and employing the preferred semiconductor materials of germanium, gallium-arsenide and aluminum-gallium-arsenide, OEIC 20 of FIGS. 5 and 6 can be formed by first depositing a film of germanium on gallium-arsenide substrate 22. Rectangular waveguide 21 is then formed by etching the film of germanium, leaving the curved shape shown in FIG. 5. Next, layer 33 is formed by depositing a film of aluminum-gallium-arsenide on gallium-arsenide substrate 22. This aluminum-gallium-arsenide film is then etched to form layer 33 at one end of waveguide 21. Next, substrate 22 is etched to form gallium-arsenide pedestal 23, thereby forming LED 31 and pedestal waveguide 24. Layer 33 acts as a P-region to form a PN junction between layer 33 and the end of pedestal 23 which acts as an N-region. When forwarded biased by generator 35, the PN junction between layer 33 and pedestal 23 emits light.

Finally, photodetector 32 is formed by depositing a film of aluminum-gallium-arsenide on gallium-arsenide substrate 22. The aluminum-gallium-arsenide film is then etched to form layer 36 at the other end of pedestal waveguide 24 to form photodetector 32. Layer 36 acts as a P-region to form a PN junction between layer 36 and substrate 22, which acts as an N-region. Layer 36 absorbs light incident thereon and generates a voltage across the PN junction between it and substrate 22. This voltage generates a current through load 38.

It is to be understood that LED 31 and photodetector 32 are shown here only as examples of the type of OEIC devices that may be interconnected via an optical waveguide, such as waveguides 11 and 24. Further, pulse generator 35 and load 38, shown schematically in FIGS. 5 and 6, may be integral parts of the integrated circuit chip that constitutes OEIC 20 or they may be lumped elements separate from the chip.

As mentioned above, the germanium films that form waveguides 11 and 24 may be deposited via ultra-high-vacuum (UHV) deposition. The present invention recognizes, however, that waveguides made from germanium films deposited on gallium-arsenide structures in an oxygen-free environment at temperatures that are too high may be inadequate because they tend to have nonuniform absorption spectrums and relatively large absorption coefficients for radiation at many wavelengths in the range of interest. During deposition, the high temperatures can cause gallium and/or arsenic atoms to diffuse from the gallium-arsenide material into the germanium film where they may later act as dopants and provide carriers for free carrier absorption of light at various wavelengths.

Conversely, germanium films deposited in an oxygen-free environment at temperatures that are too low can be amorphous. This may cause the germanium films to have a structure that will be susceptible to oxygen percolating into it from the atmosphere during later use. The oxygen impurities can form germanium-oxide bonds that create absorption peaks near important operating points, viz. a relatively sharp absorption peak may appear for light having a wave number of 830 $cm^{-1}$ and possibly a broader peak appears near 3200 $cm^{-1}$. These absorption peaks can increase waveguide transmission loss for the usual OEIC operating region between wave numbers 500 $cm^{-1}$ and 4000 $cm^{-1}$. Consequently, to minimize radiation absorption across an operating region, it is important that the semiconductor films that form waveguides 11 and 24 be deposited at an appropriate temperature that simultaneously diminishes the porosity of the semiconductor film and the diffusion of material from substrate 22 into the semiconductor film.

Optical waveguides formed from germanium films deposited on a gallium-arsenide substrate in ultra-high vacuum, i.e., where there is no oxygen, have exhibited a relatively small, uniform absorption for radiation over the band of wave numbers of interest, i.e., between wave numbers 500 $cm^{-1}$ and 4000 $cm^{-1}$, when they have been deposited at about 100 degrees centigrade. The FIG. 6 graph illustrates this with plots of absorbance, in arbitrary units, as a function of wave number, in $cm^{-1}$, for a number of waveguides formed from germanium films grown on gallium-arsenide substrates at different substrate temperatures ranging from 27 to 400 degrees centigrade. The germanium film deposited at 100 degrees centigrade exhibits a uniformly small absorbance over the band of wave numbers between 500 $cm^{-1}$ and 4000 $cm^{-1}$. Likewise, the absorption coefficients for germanium films deposited at 100 degrees centigrade was uniformly small for radiation having wave numbers between 500 $cm^{-1}$ and 4000 $cm^{-1}$; some films had absorption coefficients as small as 10 $cm^{-1}$ with a maximum value less than 15 $cm^{-1}$.

FIG. 6 shows that germanium films deposited in UHV at temperatures moderately higher than 100 degrees centigrade have a nonuniform absorbance that can become relatively large at some wavelengths, because at the higher temperatures diffusion of impurities from the substrate is not diminished, permitting significant numbers of gallium and/or arsenic atoms to diffuse across the interface into the germanium lattice where they act as dopants and provide charge carriers that can produce free-carrier absorption at various wavelengths. FIG. 6 also indicates that germanium films grown at temperatures below 100 degrees centigrade show a nonuniform absorbance that can become large at various wavelengths; specifically, a sharp absorption peak exists for light having wave numbers near 830 $cm^{-1}$ and possibly a broader peak is centered near 3200 $cm^{-1}$. Percolating oxygen can be the cause of such light absorption, since these peaks are associated with oxygen, and it is well known that the germanium-oxygen bond normally has an absorption peak near 830 $cm^{-1}$. The oxygen in this case percolates in from the atmosphere much as it does in porous amorphous silicon deposited at a low temperature. However, oxygen does not readily percolate into the films grown at about 100 degrees centigrade because they have diminished porosity when grown at that temperature.

Figure 7:
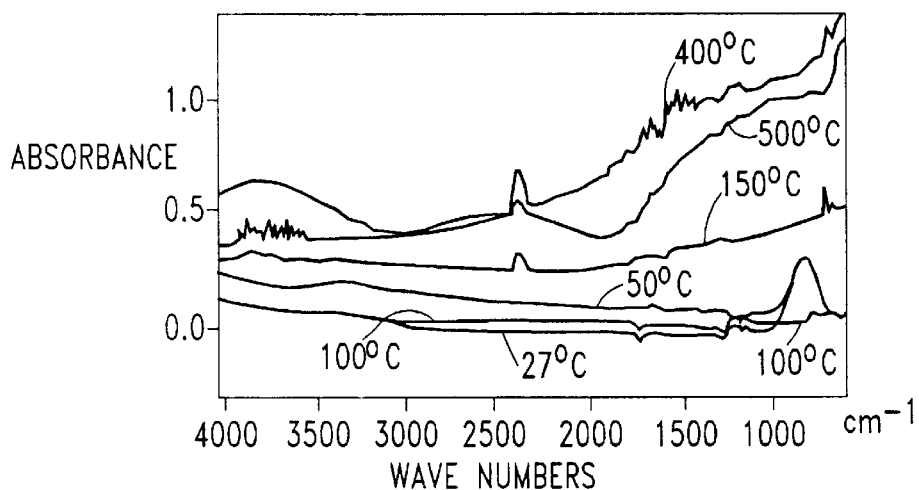
FIG. 7 is a graph of absorbance vs. wave number for light propagating in a rectangular waveguide of the type shown in FIG. 1.
Figure 8:
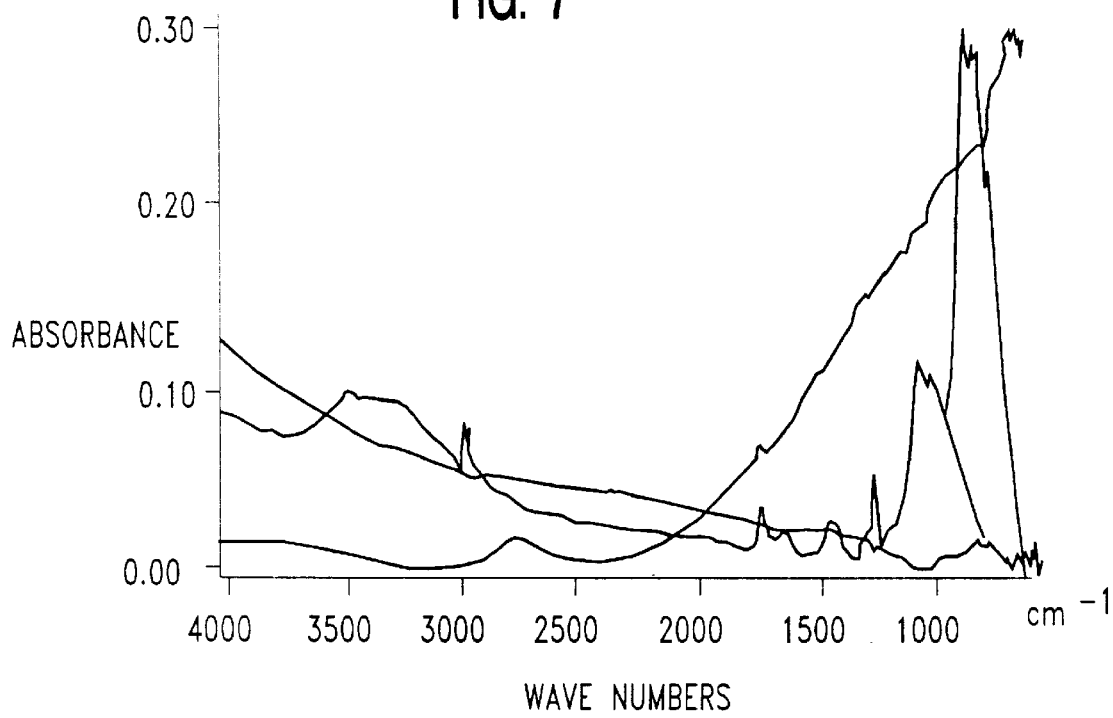
FIG. 8 is a graph of absorbance vs. wave number for light propagating in a rectangular waveguide of the type shown in FIG. 1.

The graph of FIG. 8 shows curves A, B and C depicting plots of absorbance in the same arbitrary units used in FIG. 7 as a function of wave number in $cm^{-1}$ for three germanium waveguides grown in UHV on gallium-arsenide substrates with and without native oxide on the substrates. Curve A was obtained for a germanium film that was deposited to a thickness of 6590 angstroms on a gallium-arsenide substrate at 100 degrees centigrade and in which native oxide was not removed from the substrate. For curve B, the native oxide was removed from the gallium-arsenide substrate at 600 degrees centigrade, the germanium film was deposited at room temperature, i.e., 27 degrees centigrade, and the germanium film had a thickness of 5730 angstroms. For curve C, the native oxide was removed from the gallium-arsenide substrate at 600 degrees centigrade and a germanium film was deposited to a thickness of 6440 angstroms at 100 degrees centigrade. As shown in curves B and C of FIG. 8, the absorption is small for both of the germanium films grown on an oxide-free gallium-arsenide surface and in which the native oxides were removed thermally by heating them in the UHV system prior to depositing the germanium film. However, the absorbance appears to be a little lower in the specimen for which the native oxides were present, i.e., curve A. It appears that the native oxide film on the gallium-arsenide substrate can impede the diffusion of either gallium and/or arsenic into the germanium. In either case, the absorption appears small, indicating that the deposition temperature and oxygen-free environment are the important factors.

Obviously modifications and variations of the present invention are possible in the light of the above teachings. Those skilled in the art will recognize, for instance, that the invention may be applied to a variety of other types of optical waveguides. Although waveguides 11 and 24 are shown as being disposed on the surface of substrate 22, the present invention has application for optical waveguides that may be partially or fully buried within an OEIC. Also, any active material can be grown on the gallium-arsenide substrate before the germanium deposition and interact with the strong fields at the boundary between the germanium and gallium-arsenide. As such, an entirely new class of physical devices using the intersubband transition can be used for mid-IR interaction. The possible OEIC physical phenomena include lasing, modulation, detection, second harmonic generation and other nonlinear interactions. It is therefore to be understood, that within the scope of the appended claims, the invention may be practiced otherwise than as specifically described.

What is claimed is:

1. A waveguide structure for transmitting radiation within a predetermined range of wavelengths comprising:
    a semiconductor substrate; and
    an optical waveguide mounted on said substrate, said optical waveguide including a film of semiconductor material having an index of refraction greater than that of said substrate, and having a relatively small, uniform absorption coefficient over said predetermined range of wavelengths;
    wherein said predetermined range of wavelengths extends from 2.5 microns to 13 microns.

2. The waveguide structure of claim 1 wherein said film of semiconductor material has a rectangular cross section with a width that is substantially twice its height.

3. The waveguide structure of claim 2 wherein said optical waveguide includes a pedestal mounted between said substrate and said film of semiconductor material, and wherein said pedestal has a rectangular cross section substantially equal to said cross section of said film.

4. The waveguide structure of claim 3 wherein said pedestal is formed from the same semiconductor material as said substrate.

5. The waveguide structure of claim 2 wherein said film of semiconductor material comprises germanium and said semiconductor substrate is formed from gallium-arsenide.

6. The waveguide structure of claim 5 wherein said germanium film has a substantially diminished porosity.

7. The waveguide structure of claim 6 wherein said germanium film has a substantially diminished amount of gallium-arsenide therein.

* * * * *